United States Patent [19]

Vishnitsky

[11] Patent Number: 4,690,737
[45] Date of Patent: Sep. 1, 1987

[54] ELECTROCHEMICAL RIFLING OF GUN BARRELS

[75] Inventor: Alexander Vishnitsky, Henrietta, N.Y.

[73] Assignee: Cation Corporation, Rochester, N.Y.

[21] Appl. No.: 872,704

[22] Filed: Jun. 10, 1986

[51] Int. Cl.[4] .......................... B23H 3/10; B23H 7/30; B23H 7/36
[52] U.S. Cl. .............................. 204/129.7; 204/212; 204/224 M; 204/225; 204/280; 204/272
[58] Field of Search .................. 204/212, 224 M, 225, 204/272, 129.5, 129.6, 129.7, 280, 279

[56] References Cited

U.S. PATENT DOCUMENTS

| 1,927,162 | 9/1933 | Fiedler et al. | 204/212 X |
|---|---|---|---|
| 2,848,401 | 8/1958 | Hartley | 204/129.5 |
| 3,429,798 | 2/1969 | Beck et al. | 204/212 X |
| 3,769,194 | 10/1973 | Haggerty | 204/212 X |
| 4,227,986 | 10/1980 | Loqvist et al. | 204/272 X |

FOREIGN PATENT DOCUMENTS 288200 2/1971 U.S.S.R. .................. 204/212

Primary Examiner—Donald R. Valentine
Attorney, Agent, or Firm—Cumpston & Shaw

[57] ABSTRACT

A method and apparatus for electrochemical rifling of gun barrels and the like is disclosed. In one embodiment of the apparatus, an elongate pressure chamber for receiving electrolyte fluid under pressure is mounted in alignment with an anode gun barrel and in fluid communication therewith. A cathode rod rifling assembly is mounted in the pressure chamber in axial alignment with the gun barrel. Drive means simultaneously rotates the rifling assembly and moves it relative to the barrel for passage of the rifling assembly through the barrel along with the electrolyte fluid. In another embodiment, the rifling asembly comprises first and second adjacent segments joined on a plane. Each segment has peripheral, radially outwardly extending, circumferentially spaced strips of insulation which are out of alignment with, and overlap, one another along the plane. The overlapped regions define the width of the unetched portions or lands on the barrel. In still another embodiment, an elongate cylindrical cam member having a cam groove on the periphery thereof is mounted within a gun barrel in coaxial relation. A cathode rod rifling assembly is slidably mounted on the cam member between the barrel and cam member. The rifling assembly comprises a plurality of annular segments, each having peripheral, circumferentially spaced, radially outwardly extending strips of insulation and a radially depending lug extending through a slot in the rifling assembly and into the groove on the cam member.

24 Claims, 10 Drawing Figures

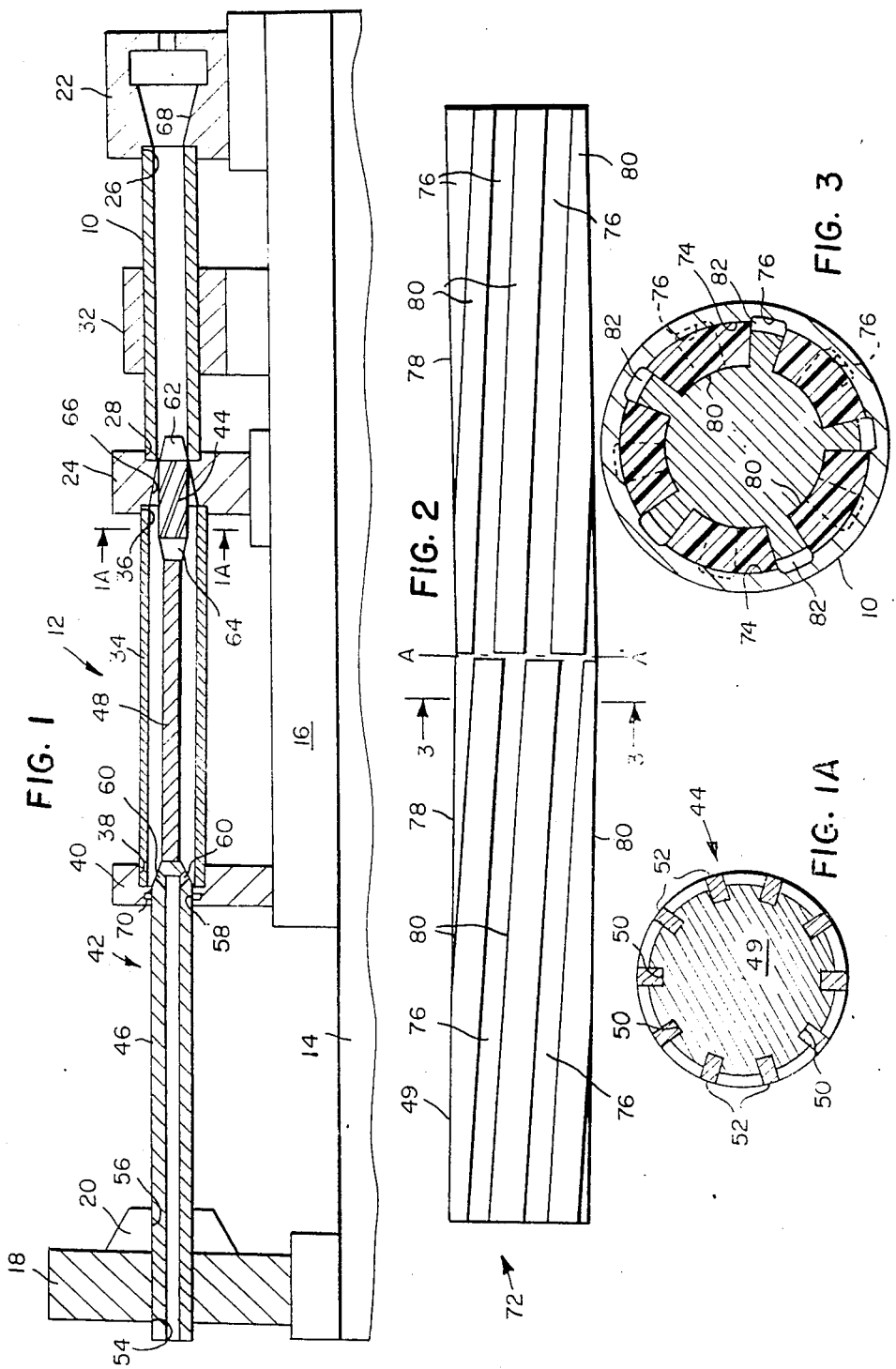

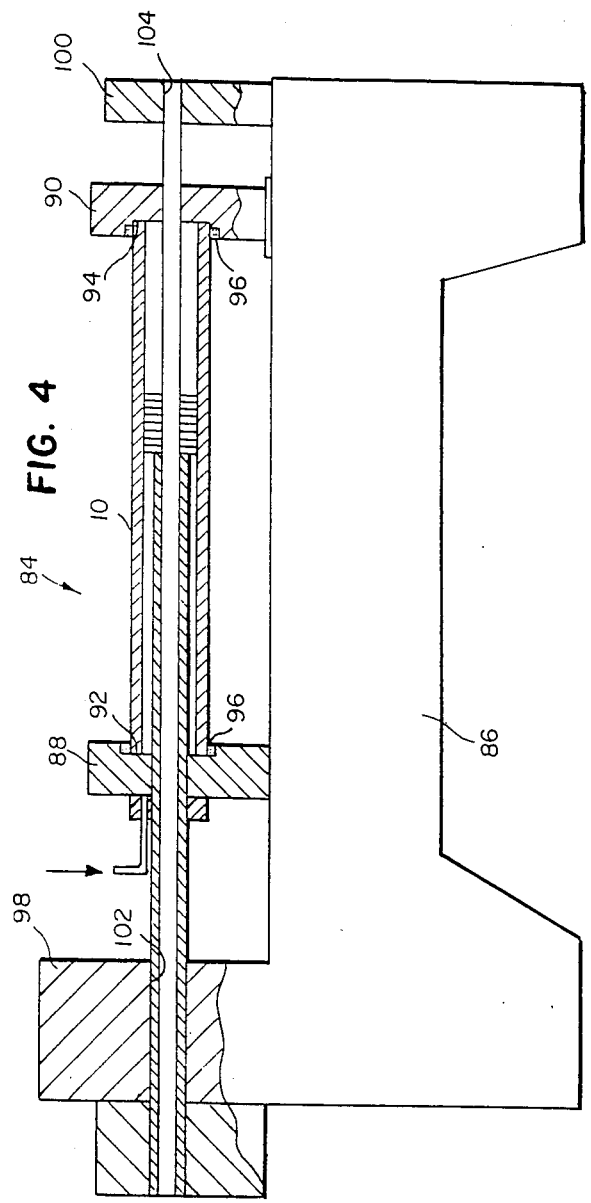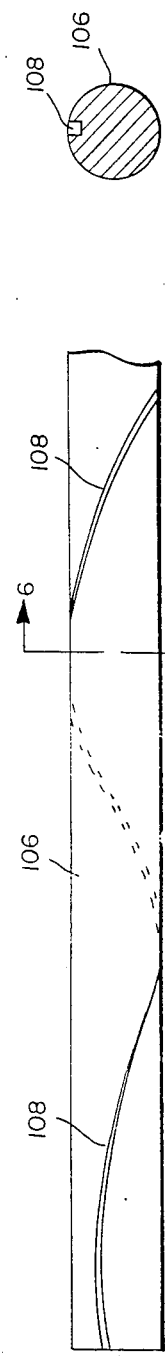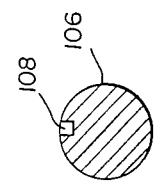

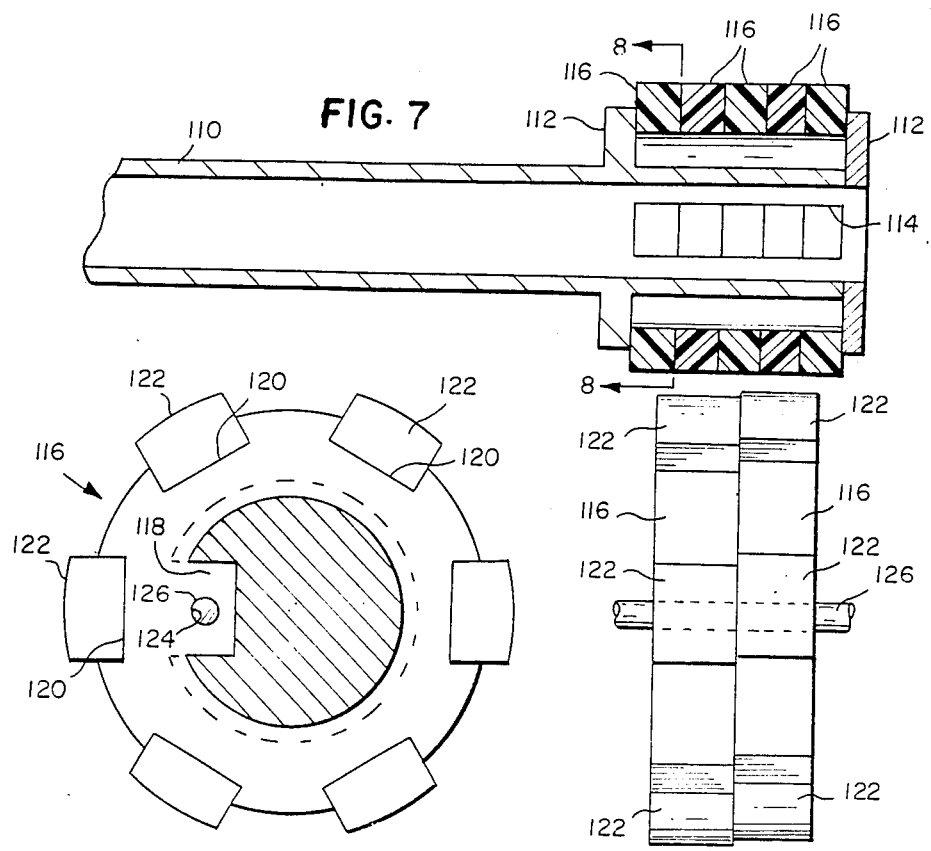

ELECTROCHEMICAL RIFLING OF GUN BARRELS

BACKGROUND OF THE INVENTION

1. Field of the Invention

This invention relates generally to material removal, and more specifically to a method and apparatus for the electrochemical rifling of gun barrels and the like.

2. Description of the Prior Art

Electrochemical rifling is a well known process in which metal is removed from the inner cylindrical surface of a gun barrel or the like along circumferentially spaced spiral grooves by electro-chemical action. In the process, the metal barrel (anode) is connected to the positive post of a rectifier, and the metal rifling rod (cathode) mounted in the barrel is connected to the negative post. The rod has spaced radially extending insulating strips on its periphery engageable with the inner surface of the barrel. The working gap between barrel and rod is filled with an electrolyte fluid flowing under high velocity and pressure. The inner cylindrical surface of the barrel facing the uninsulated parts of the rod is electrochemically dissolved or removed by anodic action, that is, by current flow from the surface of the barrel through the electrolyte to the rod. The form and size of the uninsulated areas of the rod correspond directly to the form and size of the spiral rifling grooves in the barrel. The form and size of the insulated strips of the rod correspond directly to the form and size of the lands of the barrel extending between the rifling grooves. The amount of material removed depends primarily on current density and the process cycle time. The electrochemical action attacks only the anode or inner barrel surface, and the cathode rod surface shows no wear whatsoever.

A cathode rod used in the electrochemical rifling process described above comprises a cylindrical body preferably made from brass or copper. The body is provided on its periphery with a plurality of circumferentially spaced spiral grooves, and insulator strips of plastic or the like are mounted in the grooves. The outer diameter of the insulator strips is substantially equal to the inner diameter of the barrel for insulating the contiguous inner surface of the barrel from the electrolyte fluid during an electrochemical rifling operation. The electrolyte fluid flows through the spaces between the insulated strips and the uninsulated surfaces of the rod and barrel. The current flow from the cathode through the electrolyte to the anode in the uninsulated areas of the cathode rod causes the removal of metal material from the uninsulated areas of the barrel to form rifling grooves.

In the prior known apparatus and method for electrochemical rifling, it was necessary to provide seals between portions of the cathode rod and the barrel to be rifled to prevent the escape of electrolyte fluid which is subjected to a pressure of at least 300 lbs. per square inch. The barrels are held captive between two end caps, and one of the end caps has a small diameter bore for accommodating a cathode rod shaft by which the rod is moved relative to the barrel. With this type of apparatus, it is extremely difficult to provide small diameter seals within the bore surrounding the rod that are effective to resist the high pressure to which the electrolyte fluid is subjected. This problem is solved in the present invention by adding a long cylindrical tube in alignment with the barrel and encircling a portion of the rod. The area between the rod and tube support at one end of the tube can be more effectively sealed because of the larger sealing diameter. To assist in the sealing action between the relatively moveable cathode rod and tube, the surfaces of the rod and tube are ground to a very high finish having a clearance therebetween of around three-thousandths of an inch.

Still another problem encountered in the prior known method and apparatus for electrochemical rifling involves the generation of non-laminar electrolyte fluid flow between the rod cathode and inner surface of the barrel by virtue of the shape of the rod cathode head at its leading and trailing ends. The non-laminar flow causes electrochemical anodic action that is less effective resulting in poorer rifling. This problem was solved in this invention by providing the leading and trailing ends of the cathode rod with tapered or frusto-conical surfaces that reduce turbulence and provide laminar flow resulting in better rifling.

In the known cathode rod designs for electrochemical rifling, a problem is encountered when it is desired to rifle a barrel with a large number of grooves and lands such that the width of each land is very narrow. An example of this is rifling a 20 mm caliber barrel with 18 grooves and 18 lands. In such an application, it is virtually impossible to make precise narrow insulating strips and mount them in grooves on the cathode rod. This problem was solved in the prior art by mounting only a few insulated inserts of larger width on the cathode rod and rifling only a few of the grooves in one operation. A disadvantage of this solution is that it is then necessary to rotationally index the rod or barrel one or more times to complete the rifling operation. This results in greatly reduced productivity and less accurate rifling due to the difficulty of precisely rotationally indexing the rod or barrel. These problems are solved in this invention by providing a cathode rod that is divided into at least two contiguous aligned sections, each section adapted to machine half of the grooves to be rifled. Accordingly, the insulator strips can be made considerably wider eliminating the need to provide narrow precise plastic or insulating strips with the associated problem of mounting them. This invention greatly increases the productivity of the apparatus because all grooves are machined in one pass of the cathode rod through the barrel. Also, the accuracy is greatly improved because indexing and mistakes inherent with indexing are eliminated.

SUMMARY OF THE INVENTION

In accordance with a preferred embodiment of the invention, an apparatus for electrochemical rifling of gun barrels and the like is disclosed. The apparatus comprises a fixed frame onto which a table is mounted. First mounting means are provided for mounting a barrel to be rifled on the table. Second mounting means are provided for mounting a pressure chamber on the table in alignment with the barrel and with one end of the pressure chamber in fluid communication with one end of the barrel. A cathode rod rifling assembly is slidably mounted within the pressure chamber. Means are provided for forcing an electrolyte fluid under pressure into the pressure chamber. Drive means are provided for simultaneously rotating the cathode rod rifling assembly and moving one of the cathode rod rifling assembly and anode barrel relative to the other for passage of the rifling assembly through the barrel for electrochemically rifling the barrel.

In a more specific aspect of the invention, the cathode rod rifling assembly comprises a cylindrical rifling member at one end having a frusto-conical fluid discharge end and a frusto-conical fluid inlet end.

In a still more specific aspect of the invention, the rifling member comprises a metallic core, a first segment of the core having a plurality of first grooves circumferentially spaced apart on the periphery of the first segment a distance substantially equal to the width of the desired etched riflings in the barrel, first strips of insulation mounted in the grooves and radially extending outwardly therefrom with the peripheral surfaces of the strips defining a diameter equal to the inner diameter of the barrel, a second segment of the core coaxial with and contiguous to the first segment on a plane at right angles to the axis of the first and second segment, and having a plurality of second grooves circumferentially spaced apart on the periphery of the second segment the same distance as the first grooves. The second grooves are of the same width as the first grooves, and are angularly displaced relative thereto into alignment with the lands separating the first grooves. Second strips of insulation are mounted in the second grooves and radially extend outwardly therefrom with peripheral surfaces thereof defining a diameter substantially equal to the inner diameter of the barrel. Each of the first and second insulating strips overlap one another on the plane a distance substantially equal to the width of the unetched land on the barrel. Each of the first and second strips are of a width substantially equal to the width of a groove plus twice the width of the unetched land on the barrel.

In another aspect of the invention, an apparatus for electrochemical rifling of gun barrels and the like comprises a fixed frame having a first mounting means thereon for mounting an anode barrel to be rifled. A second mounting means mounts an elongated cylindrical cam member having a spiral cam groove on the periphery thereof within and coaxially of the barrel. A cathode rod rifling assembly is slidably mounted on the cam member in the space between the cam member and the barrel. Means are provided for forcing an electrolyte fluid under pressure into the space between the rifling assembly and the barrel. Power means are coupled to the anode barrel and cathode rod rifling assembly for generating current therebetween. A drive means is provided for moving one of the rifling assembly or the cam member and barrel as a unit relative to the other for passage of the rifling assembly through the barrel for electrochemically rifling the barrel.

In a more specific aspect of the invention, the cathode rod rifling assembly comprises an elongate hollow metallic rod of annular cross-section. The rod has a pair of spaced radially extending flanges and an elongate slot extending through the hollow rod between the flanges. A plurality of annular metallic segments are mounted on the rod between the flanges, each having a radially depending lug extending through the slot and into a groove on the cam member. Each of the segments further has circumferentially spaced peripheral grooves, and strips of insulation mounted in the grooves and radially extending outwardly from the segment with the peripherial surfaces of the strips defining a diameter substantially equal to the inner diameter of the barrel. The groove on the cam member is provided with a gain twist, in which a twist is defined as the centimeters of length of the groove on the cam member for a single revolution of the groove, and a gain twist is one in which the twist progressively changes from one end of the cam member to the other.

In another aspect of the invention, a method for electrochemical rifling gun barrels and the like is disclosed comprising the steps of mounting an anode barrel and an elongate cam member extending therethrough in fixed coaxial relationship, the cam member having a sprial cam groove on its outer periphery; slidably mounting an elongate hollow cathode rifling assembly on the cam member, the rifling assembly having a plurality of captive and annular metallic segments interposed between the barrel and rod, each segment having a plurality of circumferentially spaced, radially outwardly extending insulating strips and a radially inwardly extending depending follower lug insertable in the cam groove; forcing an electrolyte fluid into the space between the inner surface of the barrel and the segments of the rifling assembly; connecting the anode barrel and the segments of the cathode rod rifling assembly to a power supply for generating current flow therebetween; and pushing or pulling one of the rifling assembly and barrel relative to the other for moving the segments from one end of the barrel to the other for electrochemically rifling the barrel to correspond to the twist of the cam groove on the cam member.

BRIEF DESCRIPTION OF THE DRAWINGS

In the detailed description of the invention presented below, reference is made to the accompanying drawings, in which:

FIG. 1 is a side elevational view in section of a preferred embodiment of an apparatus for electrochemical rifling of gun barrels and the like;

FIG. 1A is a section view taken substantially along line 1A—1A of FIG. 1;

FIG. 2 is a side elevational view of the leading end of a novel cathode rod assembly;

FIG. 3 is a section view taken substantially along line 3—3 of FIG. 2 with the barrel added;

FIG. 4 is a side elevational view of another embodiment of an apparatus for electrochemical rifling of gun barrels and the like;

FIG. 5 is an enlarged segmental side elevational view of the cam member of FIG. 4;

FIG. 6 is an enlarged section view taken substantially along line 6—6 of FIG. 5;

FIG. 7 is an enlarged side elevational view in section of the leading end of the cathode rod assembly of FIG. 4;

FIG. 8 is an enlarged section view taken substantially along line 8—8 of FIG. 7; and FIG. 9 is a side elevational view of FIG. 8 in which the cathode rod segments are mounted on a cam member having a groove of a twist, for example, of one revolution for each two hundred forty inches of cam member length.

DETAILED DESCRIPTION OF THE INVENTION

Referring now to FIG. 1 of the drawings, a preferred embodiment of an apparatus for electrochemical rifling of gun barrels 10 and the like of this invention is disclosed. The apparatus 12 incorporates many known features of known material removing machines such as a bed frame 14, a table 16 slidably mounted on spaced parallel ways, not shown, on the frame for reciprocal movement, a fixed upright head stock member 18 including a rotatable spindle 20 mounted on the frame, a tail stock member 22 slidably mounted on the table, and drive means housed in the head stock member for driving spindle 20 and table 16. In this description, all parts of apparatus 12 that are similar to known parts of material removing machines will not be shown or described in detail. This includes, for example, the drive motor and control means coupling the motor to the spindle for advancing a tool.

Gun barrel 10, which is to be rifled, is mounted between tail stock member 22 and one side of an upright support member 24 that could be fixedly or slidably mounted on table 16. One end of barrel 10 extends into a bore 26 in tail stock member 22, and the opposite end of the barrel extends into a bore 28 in support member 24. The middle portion of barrel 10 is rigidly supported by an upstanding barrel support member 32 mounted on table 16.

A preferably cylindrical pressure chamber 34 is mounted in coaxial relationship with barrel 10. One end of pressure chamber 34 extends into a bore 36 in the opposite side of support member 24 and the opposite end of chamber 34 extends into a bore 38 in a cathode rod support member 40.

A cathode rod assembly 42 for rifling barrel 10 comprises an elongate member having a cylindrical head member 44 at one end, a preferably cylindrical elongate hollow member 46 at the other end, and a center elongate member 48 connecting the head and hollow members together. As shown in FIG. 1A, head member 44 comprises a cylindrical metallic member 49 having a plurality of circumferentially spaced grooves 50 in the periphery thereof for receiving insulator strips 52 radially extending outwardly therefrom. The insulator strips may be made of any suitable insulating material, such as a phenolic, plexiglass, rubber or the like.

The hollow member 46 is slidably mounted within cylindrical bores 54, 56, 58 extending through head stock member 18, spindle 20, and cathode rod support member 40, respectively, for slidably mounting cathode rod assembly 42 in axial alignment with pressure chamber 34 and barrel 10. An electrolyte or saltwater fluid of any suitable type such as sodium chloride, sodium nitrite, sodium nitrate or sodium sulphate is fed under pressure of about 350–400 pounds per square inch and flow speed of about 60 feet per second through hollow member 46 and through openings 60 at one end of the hollow member into pressure chamber 34.

Any suitable power supply, not shown, provides a positive voltage of about 10 volts to barrel 10 forming an anode, and a negative connection to cathode rod head member 44 for generating a current of about 300 amps between the anode and cathode through the electrolyte fluid. Upon actuation of the drive motor, cathode rod assembly 42 is advanced at about 20 inches per minute through barrel 10 for rifling the inner peripheral surface thereof with spiral grooves about 4 to 5 thousandths of an inch deep. The values of voltage, current, pressure, and advance speed of the cathode rod assembly are exemplary only.

To assure laminar flow of the electrolyte fluid through the space between cathode rod head member 44 and barrel 10, the leading and trailing ends of the head member are provided with tapered frusto-conically shaped surfaces 62 and 64, respectively. The support member 24 and tail stock 22 are further provided with frusto-conically shaped surfaces 66, 68, respectively.

Since the electrolyte fluid is subjected to a pressure of about 300 to 400 pounds per square inch, a seal comprising a large diameter O-ring 70 is provided between the inner periphery of bore 58 and the cylindrical hollow member 46. The outer surface of hollow member 46 and the inner surface of bore 58 are provided with a high finish of 20 to 30 RMS. O-ring seals may also be provided between outer ends of pressure chamber 34 and inner surfaces of bores 36, 38 receiving the outer ends.

With reference to FIGS. 2 and 3, another embodiment of a cathode rod head member 72 is disclosed for use in the rifling of barrels 10 in which the lands 74 or unetched portions of the inner peripheral surface of barrel 10 located between the rifling grooves 76 are very narrow. This occurs in barrels with 18 grooves and 18 lands, for example. With a single cathode rod head member 42, it is virtually impossible to make precise plastic inserts and mount them in corrsponding grooves on the cathode rod head member. Accordingly, in prior known electrochemical rifling apparatus, the cathode rod head member 42 is provided with a small number of insulating strips of much larger width than the lands, and only a small number of the grooves 76 are made at one time. Indexing of the cathode rod head member 42 or barrel 10 and successive etching steps are is required to complete the barrel rifling. The problems inherent in the described process for rifling barrels with a large number of grooves are solved by this new embodiment of the cathode rod head member 72. In this embodiment, two or more sections 78 are provided in contiguous axial relation along a common plane A—A at right angles to the axis. The insulating strips 80 and spaces 82 therebetween in one section are angularly displaced relative to those in the other section so that the centerline of a strip 80 in one section is in alignment with the centerline of a space 82 in the other section. Since each strip 80 is wider than a space 82, each strip of one section will overlap portions of two strips in the other section a distance C which is equal to the width of each land 74 on the barrel. Since each section is designed to machine half of the grooves to be rifled, the insulator strips can be made wider, namely of a width $A = 2B + C$ where:

A = the width of each insulator strip,
B = the width of each land on the barrel disposed between a pair of adjacent rifling grooves, and
C = the space between a pair of adjacent insulating strips (the width of a rifling groove in the barrel).

With reference to FIG. 4, still another embodiment of the electrochemical rifling apparatus 84 of this invention is disclosed comprising a bed frame 86, an upstanding head stock member 88 mounted on the bed frame adjacent one end thereof, and an upstanding tail stock member 90 mounted adjacent the other end of the frame. The head and tail stock members 88, 90, respectively, may be slidably movable on the frame. A barrel 10 to be rifled is interposed between the head stock and tail stock members 88, 90 respectively, with the ends thereof insertable into bores 92 and 94 in the members. Seal means 96 are provided between the barrel ends and inner surfaces of the bores in the tail stock and head stock members to prevent the leakage of electrolyte fluid. Ends of bed frame 86 are further provided with a rigid upright housing 98 and a flange 100 having openings 102, 104, respectively, extending therethrough for supporting ends of a cylindrical cam member 106 extending through barrel 10 in coaxial relationship therewith. The cam member 106 has a spiral peripheral groove 108, as best seen in FIGS. 5 and 6. The groove 108 may have a constant twist throughout its length defined by a constant predetermined length of cam member for each turn or revolution of the groove. The cam member 108 can also be designed to provide a gain twist in which the length of the cam member for each turn or revolution of the groove will progressively decrease from one end of the cam member to the other. For example, the first revolution of the groove may be completed in 12 inches of cam member length, the second revolution of the groove may be completed in 9 inches of cam member length, the succeeding revolution of the groove completed in 4 inches of cam member length and the last revolution of the groove completed in 2 inches of the cam member length providing an exponential gain twist.

With reference to FIGS. 7-9, the cathode rod assembly which is slidably mounted on the cam member will now be described. The cam rod assembly comprises a cylindrical hollow rod 110 of annular cross-section having a pair of spaced radially extending flanges 112. The rod 110 is preferably formed from a rigid plastic or a metal coated with an insulating layer. An elongated slot 114 extends through the hollow rod between flanges 112. A plurality of annular metallic segments 116, preferably made of brass or copper, are mounted on rod 110 between flanges 112. Although five segments are shown in FIG. 7, this is exemplary only since a larger number may be provided. Each of the segments 116 has a radially depending lug 118, as seen in FIG. 8, which extends through slot 114 and into spiral groove 108 on cam member 106. The slot 114 is wider than depending lug 118 to allow slight rotational movement of segments 116 relative to one another of as much as 2° as the lugs conform to spiral cam groove 108, as best seen in FIG. 9. FIG. 9 is exemplary in depicting two segments of a cathode rod assembly in which the twist is one turn for each 240 inches of cam member length.

Each of the segments 116 further has circumferentially spaced peripheral grooves 120, and strips 122 of insulation mounted in the grooves and radially extending outwardly from the segment with the peripheral surfaces of the strips defining a diameter substantially equal to the inner diameter of the barrel. Each of the segment lugs 118 has an opening 124 extending therethrough for receiving a flexible electric wire 126 for electrically connecting the segments 116 to a negative terminal of the power source.

While preferred embodiments of the invention have been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. An apparatus for electrochemical rifling of gun barrels comprising:
   a fixed frame;
   a table mounted on said frame;
   first mounting means for mounting an anode barrel to be rifled on said table;
   a pressure chamber;
   second mounting means for mounting said pressure chamber on said table in alignment with said barrel and with one end of said pressure chamber in fluid communication with one end of the barrel;
   a cathode rod rifling assembly in axial alignment with the barrel and slidably moveable within said pressure chamber and through the barrel said cathode rod rifling assembly comprising a cylindrical rifling member at one end, a hollow member at the opposite end, and a solid member interconnecting said rifling member to said hollow member;
   means for forcing an electrolyte fluid under pressure into said pressure chamber;
   power means coupled to the anode barrel and cathode rod rifling assembly for generating current therebetween through the electrolyte fluid; and
   drive means for simultaneously rotating said cathode rod rifling assembly and moving one of said cathode rod rifling assembly and the anode barrel relative to the other for passage of the rifling assembly and electrolyte fluid through the barrel for electrochemically rifling the barrel.

2. The apparatus according to claim 1 wherein said first mounting means is fixed, and said table is reciprocally moveable on said frame between a first position in which one end of said cathode rod rifling assembly is at said one end of said barrel, and a second position in which said end of said cathode rod rifling assembly has passed through the opposite end of said barrel.

3. The apparatus according to claim 2 wherein said barrel, said pressure chamber and said cathode rod rifling assembly are all mounted in axial alignment with one another.

4. The apppratus according to claim 1, and further comprising seal means interposed between said second mounting means and said hollow member of said cathode rod rifling assembly.

5. The apparatus according to claim 4 wherein said second mounting means comprises a flange member rigidly supporting the opposite end of said pressure chamber and having an opening slidably supporting said hollow member of said cathode rod rifling assembly, and said seal means is mounted on the inner periphery of said opening in sealing engagement with the outer periphery of said hollow member.

6. The apparatus according to claim 1 wherein said rifling member is of one diameter, said hollow member is cylindrical and of a greater diameter than said one diameter, and said solid member is cylindrical and of a diameter smaller than said one diameter.

7. The apparatus according to claim 6 wherein said rifling member has a frusto-conical electrolyte fluid discharge end and a frusto-conical electrolyte fluid inlet end merging with said solid member.

8. The apparatus according to claim 7 wherein said hollow member has slots fluidly connecting the hollow portion of said hollow member to said pressure chamber.

9. The apparatus according to claim 1 wherein said rifling member comprises a metallic core, a plurality of circumferentially spaced grooves on the periphery of said core, and strips of insulation mounted in said grooves and radially extending outwardly therefrom with the peripheral surfaces of said strips defining a diameter substantially equal to the inner diameter of said barrel.

10. The apparatus according to claim 1 wherein said rifling member comprises a metallic core, a first segment of said core having a plurality of first grooves circumferentially spaced apart on the periphery of said first segment a distance C substantially equal to the width of the desired etched riflings in the barrel, first strips of insulation mounted in said grooves and radially extending outwardly with the peripheral surfaces of said first strips defining a diameter equal to the inner diameter of the barrel, a second segment of said core contiguous to said first segment on a plane at right angles to the axis of said first and second segments, and having a plurality of second grooves circumferentially spaced apart said distance C on the periphery of said second segment, said second grooves being of the same width as, and interposed between, said first grooves, second strips of insulation mounted in said second grooves and radially extending outwardly therefrom with the peripherial surfaces of said second strips defining a diameter substantially equal to the inner diameter of said barrel, each of said first and second strips overlapping one another on said plane a distance B substantially equal to the width of the unetched land on the barrel, each of said first and second strips further being of a width $A = 2B + C$.

11. The apparatus according to claim 10, and further comprising slots at the overlapping portions of said strips at said plane to provide electrolyte communication between said first and said second segments.

12. A cathode rod assembly for use in the electrochemical rifling of gun barrels comprising:
   an elongate cylindrical rifling member at one end;
   an elongate hollow member at the opposite end; and
   an elongate solid member interconnecting said rifling member to said hollow member.

13. The cathode rod assembly according to claim 12 wherein said rifling member is of one diameter, said hollow member is cylindrical and of a greater diameter than said one diameter, and said solid member is cylindrical and of a diameter smaller than said one diameter.

14. The cathode rod assembly according to claim 13 wherein said rifling member has a frusto-conical electrolyte fluid discharge end and a frusto-conical electrolyte fluid inlet end merging with said solid member.

15. The cathode rod assembly according to claim 14 wherein said hollow member has slots fluidly connecting the hollow portion of said hollow member to said pressure chamber.

16. A cathode rod assembly according to claim 12 wherein said rifling member comprises a metallic core, a first segment of said core having a plurality of first grooves circumferentially spaced apart on the periphery of said first segment a distance C substantially equal to the width of the desired etched riflings in the barrel, first strips of insulation mounted in said grooves and radially extending outwardly therefrom with the peripherial surfaces of said first strips defining a diameter equal to the inner diameter of the barrel, a second segment of said core contiguous to said first segment on a plane at right angles to the axis of said first and second segments, and having a plurality of second grooves circumferentially spaced apart said distance C on the periphery of said second segment, said second grooves being of same width as, and interposed between, said first grooves, second strips of insulation mounted in said second grooves and radially extending outwardly therefrom with the peripheral surfaces of said second strips defining a diameter substantially equal to the inner diameter of said barrel, each of said first and second strips overlapping one another on said plane a distance B substantially equal to the width of the unetched land on the barrel, each of said first and second strips further being of a width $A = 2B + C$.

17. A cathode rod assembly according to claim 16, and further comprising slots in the overlapping portions of said strips at said plane to provide electrolyte fluid communication between said first and second segments.

18. An apparatus for electrochemical rifling of gun barrels comprising:
   a fixed frame;
   first mounting means on said frame for mounting an anode barrel to be rifled;
   an elongate cylindrical cam member of a smaller diameter than the barrel and having a spiral cam groove on the periphery thereof;
   second mounting means for mounting said cam member within the barrel coaxially thereof;
   a cathode rod rifling assembly slidably mounted on said cam member and interposed between said cam member and the barrel and defining a space therebetween;
   means for forcing an electrolyte fluid under pressure into the space between said rifling assembly and the barrel;
   power means coupled to the anode barrel and cathode rod rifling assembly for generating current therebetween; and
   drive means for moving said rifling assembly relative to the barrel for passage of the rifling assembly through the barrel for electrochemically rifling the barrel.

19. The apparatus according to claim 18 wherein said first mounting means is adjustable to accommodate barrels of varying length and rigidly mounts the barrel to said frame, wherein said second mounting means rigidly mounts said cam member to said frame, and wherein said drive means is coupled to said rifling assembly for pushing or pulling said rifling assembly on said cam member from one end of the barrel to the other.

20. The apparatus according to claim 19 wherein said cathode rod rifling assembly comprises an elongate hollow electrically insulated rod, a pair of spaced radially extending flanges on said rod, an elongate slot extending through said hollow rod between said flanges, and annular metallic segments mounted on said rod between said flanges, each of said segments having a radially depending lug extending through said slot and into said groove on said cam member.

21. The apparatus according to claim 20 wherein each of said segments has circumferentially spaced peripherial grooves, and strips of insulation mounted in said grooves and radially extending outwardly from said segment with the peripherial sufaces of said strips defining a diameter substantially equal to the inner diameter of the barrel.

22. The apparatus according to claim 18 wherein said groove on said cam member has a gain twist in which the length of the cam member for each turn or revolution of the groove progressively decreases from one end of the cam member to the other.

23. The apparatus according to claim 21 wherein each of the said segment lugs has an opening extending therethrough, and said segments are all electrically connected together and to said cam member by a flexible electric wire of said power means passing through said openings.

24. A method for electrochemically rifling barrels comprising the steps of:
   mounting an anode barrel and an elongate cam member extending therethrough in fixed coaxial relationship, said cam member having a spiral cam groove on its outer periphery;

slidably mounting an elongate hollow cathode rod rifling assembly on said cam member, said rifling assembly having a plurality of captive annular metallic segments interposed between the barrel and rod rifling assembly and defining a space therebetween, each segment having a plurality of circumferentially spaced, radially outwardly extending insulating strips and a radially inwardly extending depending follower lug insertable in said cam groove;

forcing an electrolyte fluid into the space between the inner surface of the barrel and the segments of said rifling assembly;

subjecting said anode barrel and said segments of said cathode rod rifling assembly to a power supply for generating current flow therebetween; and pushing or pulling said rifling assembly relative to the barrel for moving said segments from one end of the barrel to the other for electrochemically rifling the barrel corresponding to the twist of the cam groove on said cam member.

* * * * *